US012567361B2

(12) United States Patent
Lee

(10) Patent No.: US 12,567,361 B2
(45) Date of Patent: Mar. 3, 2026

(54) GATE SIGNAL GENERATION CIRCUIT AND DISPLAY DEVICE INCLUDING THE SAME

(71) Applicant: LG Display Co., Ltd., Seoul (KR)

(72) Inventor: Jung Hyun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/944,655

(22) Filed: Nov. 12, 2024

(65) Prior Publication Data

US 2025/0209973 A1 Jun. 26, 2025

(30) Foreign Application Priority Data

Dec. 26, 2023 (KR) ........................ 10-2023-0191163

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2310/0286* (2013.01); *G09G 2320/045* (2013.01)

(58) Field of Classification Search
CPC ............. G09G 3/32; G09G 2300/0819; G09G 2300/0852; G09G 2310/0286; G09G 2320/045
See application file for complete search history.

(56) References Cited

U.S. PATENT DOCUMENTS

2014/0321599 A1* 10/2014 Cho ....................... G11C 19/28
377/64
2016/0284293 A1 9/2016 Dai
2024/0212612 A1* 6/2024 Jung .................... G11C 19/287

FOREIGN PATENT DOCUMENTS

JP 2017-530379 A 10/2017
KR 10-2014-0129731 A 11/2014

OTHER PUBLICATIONS

Office Action issued on Nov. 18, 2025 in Japanese Patent Application No. 2024-199644 with English translation.

* cited by examiner

*Primary Examiner* — Kenneth B Lee, Jr.
(74) *Attorney, Agent, or Firm* — Morgan, Lewis & Bockius LLP

(57) ABSTRACT

Provided is a display device including a display panel configured to display an image, and a shift register connected to the display panel and including stages each having an output terminal for outputting a gate signal and a carry terminal for outputting a carry signal, where an Nth stage among the stages includes a signal generator configured to operate based on an Nth clock signal, an (N−4)th carry signal, an (N+4)th gate signal, an (N+4)th carry signal, a first low voltage, and a second low voltage, and a compensation circuit configured to operate based on potentials of a Q-node and a QB-node included in the signal generator and a signal output from another stage, and including a transistor configured to form a compensation voltage at the QB-node to compensate for deterioration of a transistor connected to the QB-node.

10 Claims, 15 Drawing Sheets

GATE SIGNAL GENERATION CIRCUIT AND DISPLAY DEVICE INCLUDING THE SAME

CROSS-REFERENCE TO RELATED APPLICATIONS

This application claims the benefit of and priority to Korean Patent Application No. 10-2023-0191163, filed on Dec. 26, 2023, the entire contents of which are incorporated herein by reference for all purposes, as if fully set forth herein.

BACKGROUND

1. Technical Field

The present disclosure relates to display devices, and particularly to, for example, without limitation, a gate signal generation circuit and a display device including the same.

2. Discussion of the Related Art

With the development of information technology, the market for display devices that are media for connection between users and information has been growing. Accordingly, display devices such as a light-emitting display (LED) device, a quantum dot display (QDD), and a liquid crystal display (LCD) have been increasingly used.

The above display devices each include a display panel including subpixels, a driver configured to output a driving signal for driving of the display panel, and a power supply configured to generate power to be supplied to the display panel or the driver.

In such a display device, when subpixels formed in a display panel are supplied with driving signals, for example, scan signals and data signals, a selected one of the subpixels may transmit light therethrough or may directly emit light, thereby displaying an image.

The description of the related art should not be assumed to be prior art merely because it is mentioned in or associated with this section. The description of the related art includes information that describes one or more aspects of the subject technology, and the description in this section does not limit the invention.

SUMMARY

One or more aspects of the present disclosure are directed to a gate signal generation circuit and a display device including the same that substantially obviate one or more problems due to limitations and disadvantages of the related art.

One or more aspects of the present disclosure improve a problem due to a shift of a threshold voltage by compensating for deterioration of a transistor in each frame, reduces output deviation between stages, and prevents defects due to deterioration from being transmitted to a specific stage.

Additional advantages, aspects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these aspects and other advantages and in accordance with one or more example embodiments of the disclosure, as embodied and broadly described herein, a display device includes a display panel configured to display an image, and a shift register connected to the display panel and including stages each having an output terminal for outputting a gate signal and a carry terminal for outputting a carry signal, wherein an Nth stage among the stages includes a signal generator configured to operate based on an Nth clock signal applied through an Nth clock signal line, an (N−4)th carry signal output through a carry terminal of an (N−4)th stage, an (N+4)th gate signal output through an output terminal of an (N+4)th stage, an (N+4)th carry signal output through a carry terminal of the (N+4)th stage, a first low voltage applied through a first low-voltage line, and a second low voltage applied through a second low-voltage line, and a compensation circuit configured to operate based on potentials of a Q-node and a QB-node included in the signal generator and a signal output from another stage, and including a transistor configured to form a compensation voltage at (or in) the QB-node to compensate for deterioration of a transistor connected to the QB-node, and wherein N is a whole number.

The compensation circuit may operate based on the potentials of the Q-node and the QB-node and at least one of the (N+4)th gate signal output through the output terminal of the (N+4)th stage or the (N+4)th carry signal output through the carry terminal of the (N+4)th stage, and forms the compensation voltage at (or in) the QB-node.

The compensation circuit may include a first compensation transistor turned on based on the potential of the Q-node, a second compensation transistor turned on based on the (N+4)th carry signal, and a third compensation transistor turned on based on the potential of the QB-node, and the compensation voltage may be formed in response to a sum of the potential of the QB-node and a threshold voltage of the third compensation transistor.

The compensation circuit may include a first compensation transistor having a gate electrode connected to the Q-node, a first electrode connected to the output terminal of the (N+4)th stage, and a second electrode connected to the QB-node, a second compensation transistor having a gate electrode connected to the carry terminal of the (N+4)th stage and a first electrode connected to the second electrode of the first compensation transistor and the QB-node, and a third compensation transistor having a gate electrode connected to the QB-node, a first electrode connected to the second electrode of the second compensation transistor, and a second electrode connected to the second low-voltage line configured to apply a second low voltage lower than a first low voltage for forming the carry signal.

The compensation circuit may include a first compensation transistor having a gate electrode connected to the Q-node, a first electrode connected to the carry terminal of the (N+4)th stage, and a second electrode connected to the QB-node, a second compensation transistor having a gate electrode connected to the carry terminal of the (N+4)th stage and a first electrode connected to the second electrode of the first compensation transistor and the QB-node, and a third compensation transistor having a gate electrode connected to the QB-node, a first electrode connected to the second electrode of the second compensation transistor, and a second electrode connected to the second low-voltage line configured to apply a second low voltage lower than a first low voltage for forming the carry signal.

The compensation circuit may include a first compensation transistor having a gate electrode connected to the Q-node included in the signal generator, a first electrode connected to the output terminal of the (N+4)th stage, and a second electrode connected to the QB-node, a second compensation transistor having a gate electrode connected to the output terminal of the (N+4)th stage and a first electrode connected to the second electrode of the first compensation transistor and the QB-node, and a third compensation transistor having a gate electrode connected to the QB-node, a first electrode connected to the second electrode of the second compensation transistor, and a second electrode connected to the second low-voltage line configured to apply a second low voltage lower than a first low voltage for forming the carry signal.

In one or more aspects of the present disclosure, a gate signal generation circuit includes a shift register including stages each having an output terminal for outputting a gate signal and a carry terminal for outputting a carry signal, wherein an Nth stage among the stages includes a signal generator configured to operate based on an Nth clock signal applied through an Nth clock signal line, an (N−4)th carry signal output through a carry terminal of an (N−4)th stage, an (N+4)th gate signal output through an output terminal of an (N+4)th stage, an (N+4)th carry signal output through a carry terminal of the (N+4)th stage, a first low voltage applied through a first low-voltage line, and a second low voltage applied through a second low-voltage line, and a compensation circuit configured to operate based on potentials of a Q-node and a QB-node included in the signal generator and a signal output from another stage, and including a transistor configured to form a compensation voltage at (or in) the QB-node to compensate for deterioration of a transistor connected to the QB-node, and wherein N is a whole number.

The compensation circuit may include a first compensation transistor having a gate electrode connected to the Q-node, a first electrode connected to the output terminal of the (N+4)th stage, and a second electrode connected to the QB-node, a second compensation transistor having a gate electrode connected to the carry terminal of the (N+4)th stage and a first electrode connected to the second electrode of the first compensation transistor and the QB-node, and a third compensation transistor having a gate electrode connected to the QB-node, a first electrode connected to the second electrode of the second compensation transistor, and a second electrode connected to the second low-voltage line configured to apply a second low voltage lower than a first low voltage for forming the carry signal.

The compensation circuit may include a first compensation transistor having a gate electrode connected to the Q-node, a first electrode connected to the carry terminal of the (N+4)th stage, and a second electrode connected to the QB-node, a second compensation transistor having a gate electrode connected to the carry terminal of the (N+4)th stage and a first electrode connected to the second electrode of the first compensation transistor and the QB-node, and a third compensation transistor having a gate electrode connected to the QB-node, a first electrode connected to the second electrode of the second compensation transistor, and a second electrode connected to the second low-voltage line configured to apply a second low voltage lower than a first low voltage for forming the carry signal.

The compensation circuit may include a first compensation transistor having a gate electrode connected to the Q-node included in the signal generator, a first electrode connected to the output terminal of the (N+4)th stage, and a second electrode connected to the QB-node, a second compensation transistor having a gate electrode connected to the output terminal of the (N+4)th stage and a first electrode connected to the second electrode of the first compensation transistor and the QB-node, and a third compensation transistor having a gate electrode connected to the QB-node, a first electrode connected to the second electrode of the second compensation transistor, and a second electrode connected to the second low-voltage line configured to apply a second low voltage lower than a first low voltage for forming the carry signal.

It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure. In the drawings.

Figure 1:
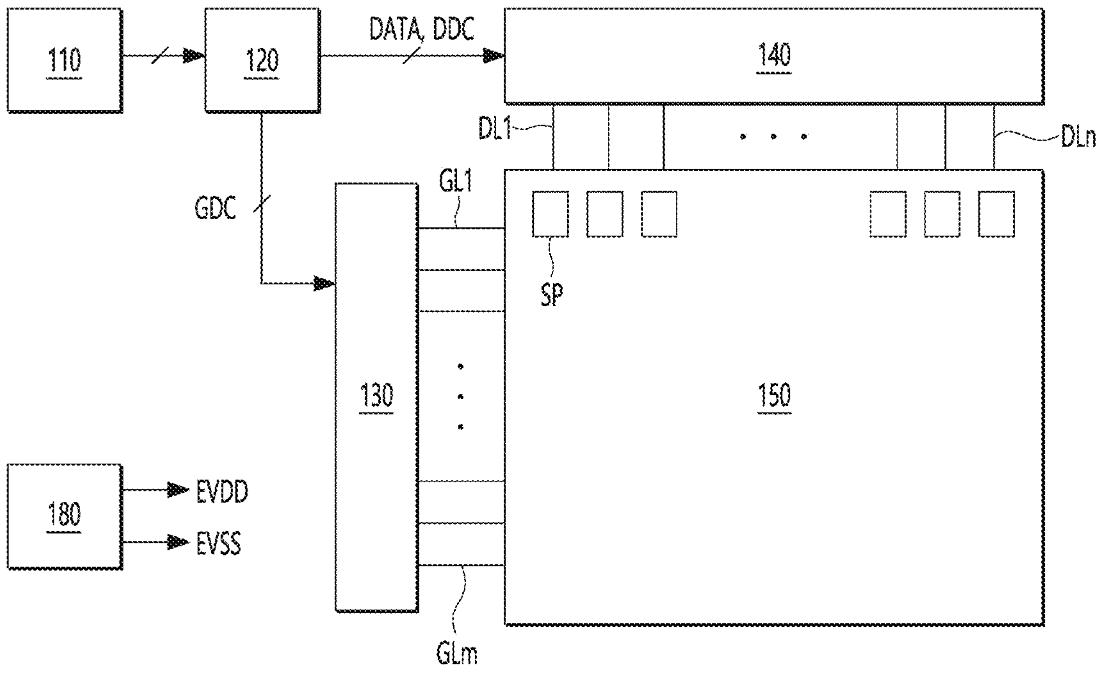
FIG. 1 is an example of a block diagram schematically illustrating a light-emitting display (LED) device.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure. Further, the present disclosure is defined by the scope of claims and their equivalents.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements (e.g., layers, components, transistors, sections, parts, areas, portions, steps, operations, and/or the like), one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. For example, an element may be one or more elements. An element may include a plurality of elements. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a temporal relationship, when the temporal order is described as, for example, "after," "following," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

In description of flow of a signal, for example, when a signal is provided from a node A to a node B, this may include a case where the signal is transferred from the node A to the node B via one or more nodes unless a phrase such as "immediately transferred," "directly transferred" or the like is used.

It is understood that, although the terms "first," "second," and the like may be used herein to describe various elements (e.g., layers, components, transistors, sections, parts, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

The expression that an element (e.g., layer, component, transistor, section, part, area, portion, or the like) "is engaged" with another element may be understood, for example, as that the element may be either directly or indirectly engaged with the another element. The term "is engaged" or similar expressions may refer to a term such as "is in contact," "overlaps," "crosses," "intersects," "is connected," "is coupled," "is attached," "is combined," "is linked," "is provided," "is disposed," "interacts," or the like. The engagement may involve one or more intervening elements disposed or interposed between the element and the another element, unless otherwise specified. Further, the element may be engaged at least partially or entirely (or completely) with the another element, unless otherwise specified. Further, the element may be included in at least one of two or more elements that are engaged with each other. Similarly, the another element may be included in at least one of two or more elements that are engaged with each other. When the element is engaged with the another element, at least a portion of the element may be engaged with at least a portion of the another element. The term "with another element" or similar expressions may be understood as "another element," or "with, to, in, or on another element," as appropriate by the context. Similarly, the term "with each other" may be understood as "each other," or "with, to, or on each other," as appropriate by the context.

The phrase "through" may be understood, for example, to be at least partially through or entirely through.

The terms such as a "line" or "direction" should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item. Further, at least one of a plurality of elements can represent (i) one element of the plurality of elements, (ii) some elements of the plurality of elements, or (iii) all elements of the plurality of elements. Further, "at least some," "at least some portions," "at least some parts," "at least a portion," "at least one or more portions," "at least a part," "at least one or more parts," "at least some elements," "one or more," or the like of a plurality of elements can represent (i) one element of the plurality of elements, (ii) a portion (or a part) of the plurality of elements, (iii) one or more portions (or parts) of the plurality of elements, (iv) multiple elements of the plurality of elements, or (v) all of the plurality of elements. Moreover, "at least some," "at least some portions," "at least some parts," "at least a portion," "at least one or more portions," "at least a part," "at least one or more parts," or the like of an element can represent (i) a portion (or a part) of the element, (ii) one or more portions (or parts) of the element, or (iii) the element, or all portions of the element.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "nth" may refer to "nnd" (e.g., 2nd where n is 2), or "nrd" (e.g., 3rd where n is 3), and n may be a natural number or a whole number.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

A phrase "substantially the same" or "nearly the same" may indicate a degree of being considered as being equivalent to each other taking into account minute differences due to errors in the manufacturing process.

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein. For example, the term "part" or "unit" may apply, for example, to a separate circuit, component or structure, an integrated circuit, a computational block of a circuit device, or a structure configured to perform a described function as should be understood by one of ordinary skill in the art.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in more detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

A display device according to the present disclosure may be implemented as a television, a video player, a personal computer (PC), a home theater, an automotive electric device, or a smartphone, but is not limited thereto. The display device according to the present disclosure may be implemented as an LED device, a QDD, or an LCD. For convenience of description, an LED device that directly emits light based on an inorganic light-emitting diode or an organic light-emitting diode will hereinafter be taken as an example.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole may flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron may flow from the source to the drain. In the n-type TFT, an electron flows from the source to the drain side, and thus current flows from the drain to the source side. However, the source and the drain of the TFT may be changed depending on the applied voltage. Reflecting this, in the following description, one of the source and drain will be described as a first electrode, and the other of the source and drain will be described as a second electrode.

Figure 2:
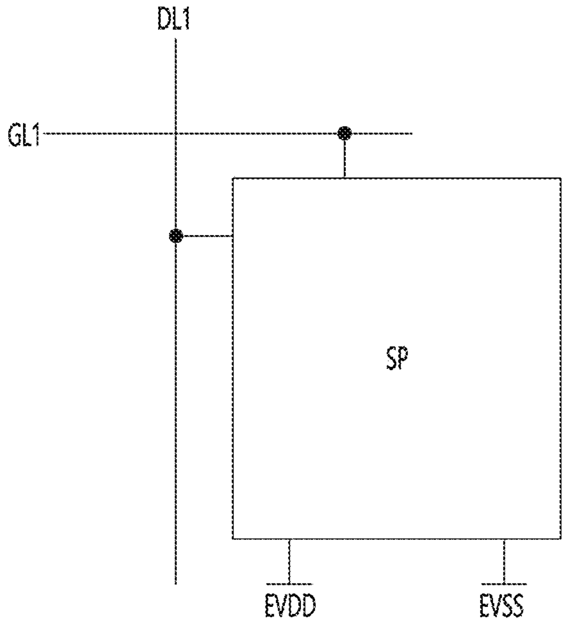
FIG. 2 is an example of a block diagram schematically illustrating a subpixel illustrated in FIG. 1.

FIG. 1 is an example of a block diagram schematically illustrating an LED device, and FIG. 2 is an example of a block diagram schematically illustrating a subpixel illustrated in FIG. 1.

As illustrated in FIGS. 1 and 2, the LED device may include a timing controller 120, a gate driver 130, a data driver 140, a display panel 150, a power supply 180, etc.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC for control of operation timing of the gate driver 130, a data timing control signal DDC for control of operation timing of the data driver 140, various synchronization signals (a vertical synchronization signal VSYNC and a horizontal synchronization signal HSYNC), etc. The timing controller 120 may supply a data signal DATA supplied from the image supply 110 together with the data timing control signal DDC to the data driver 140. The timing controller 120 may take the form of an integrated circuit (IC) and be mounted on a printed circuit board, but is not limited thereto.

The gate driver 130 may output a gate signal (or gate voltage) in response to the gate timing control signal GDC supplied from the timing controller 120. The gate driver 130 may supply the gate signal to each of subpixels included in the display panel 150 through gate lines GL1 to GLm. The gate driver 130 may take the form of an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply data voltages to the subpixels included in the display panel 150 through data lines DL1 to DLn. The data driver 140 may take the form of an IC and be mounted on the display panel 150 or on the printed circuit board, but is not limited thereto.

The power supply 180 may generate a high-potential voltage and a low-potential voltage based on an external input voltage supplied from the outside and output the high-potential voltage and the low-potential voltage through a first power line EVDD and a second power line EVSS. The power supply 180 may generate and output not only the high-potential voltage and the low-potential voltage, but also a voltage (for example, a gate voltage including a gate high potential and a gate low voltage) required to drive the scan driver 130 or a voltage (a drain voltage including a drain voltage and a half drain voltage) required to drive the data driver 140.

The display panel 150 may display an image in response to a driving signal including a gate signal and a data voltage, a driving voltage including a high-potential voltage and a low-potential voltage, etc. Subpixels of the display panel 150 directly emit light. The display panel 150 may be manufactured based on a rigid or flexible substrate of glass, silicon, polyimide, etc. Further, the subpixels that emit light may include pixels including red, green, and blue, or pixels including red, green, blue, and white.

For example, one subpixel SP may be connected to the first data line DL1, the first gate line GL1, the first power line EVDD, and the second power line EVSS, and may include a pixel circuit including a switching transistor, a driving transistor, a capacitor, an organic light-emitting diode, etc. The subpixel SP used in the LED device directly emits light, and thus has a complex circuit configuration. In addition, there are various compensation circuits that compensate for deterioration of not only the organic light-emitting diode that emits light, but also the driving transistor that supplies a driving current required to drive the organic light-emitting diode. Therefore, note that the subpixel SP is simply shown in the form of a block.

Meanwhile, the timing controller 120, the gate driver 130, the data driver 140, etc., have been described above as having individual configurations. However, one or more of the timing controller 120, the gate driver 130, and the data driver 140 may be integrated into one IC depending on the implementation scheme of the LED device.

Figure 3:
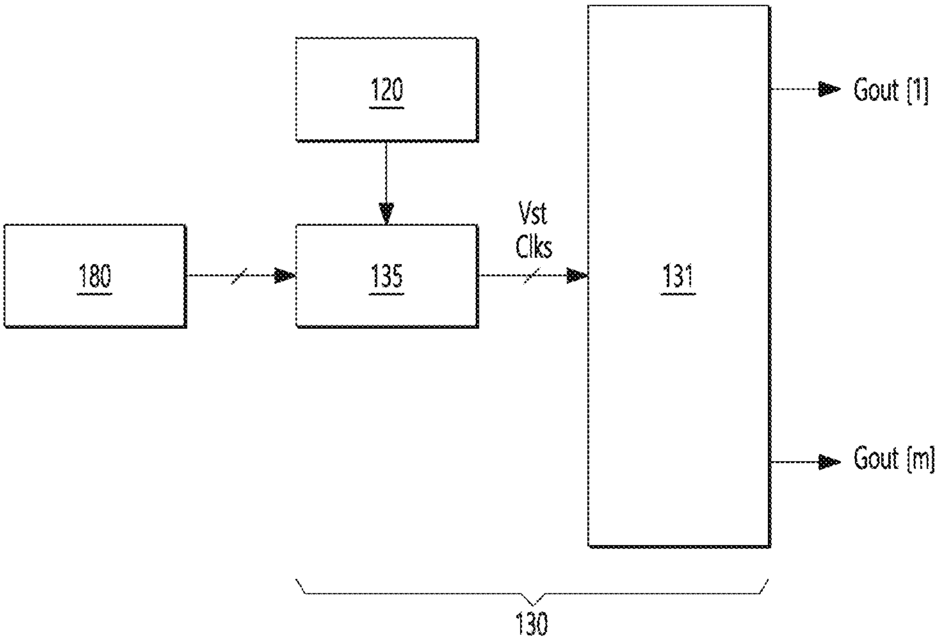
FIGS. 3 and 4 are examples of diagrams for describing a configuration of a gate-in-panel (GIP)-type gate driver.
Figure 4:
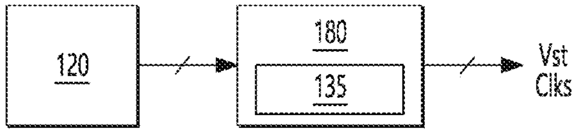
Figure 5:
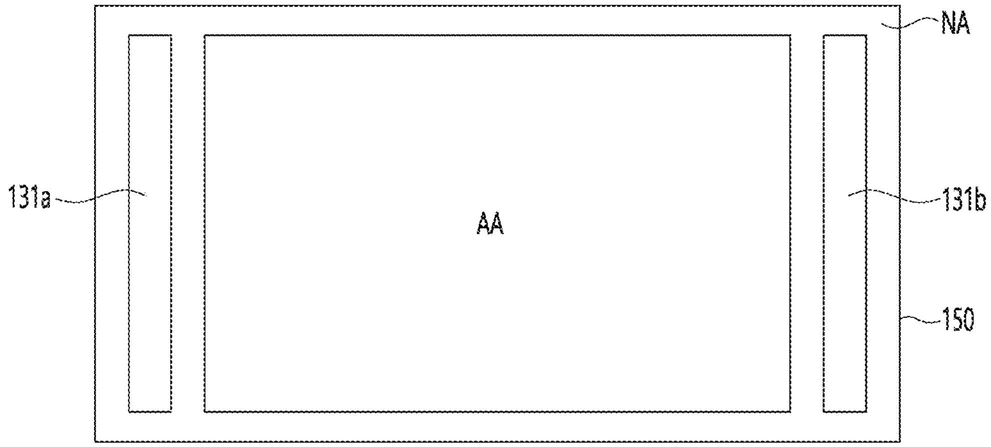
FIG. 5 is an example of a diagram illustrating an arrangement example of the GIP-type gate driver.

FIGS. 3 and 4 are examples of diagrams for describing a configuration of a GIP-type gate driver, and FIG. 5 is an example of a diagram illustrating an arrangement example of the GIP-type gate driver.

As illustrated in FIG. 3, the GIP-type gate driver 130 may include a shift register 131 and a level shifter 135. The level shifter 135 may generate clock signals Clks, a start signal Vst, etc. based on signals and voltages output from the timing controller 120 and the power supply 180. The shift register 131 may operate based on the clock signals Clks and the start signal Vst output from the level shifter 135 and output gate signals Gout[1] to Gout[m].

As illustrated in FIGS. 3 and 4, unlike the shift register 131, the level shifter 135 may independently take the form of an IC or be included in the power supply 180. However, this is only an example and the present disclosure is not limited thereto.

As illustrated in FIG. 5, in the GIP-type gate driver, first and second shift registers 131*a* and 131*b* configured to output gate signals may be disposed in a non-active area NA of the display panel 150. The first and second shift registers 131*a* and 131*b* may each take the form of a thin film on the display panel 150 using a GIP method. The first and second shift registers 131*a* and 131*b* are shown as being disposed on the left and right sides of the non-active area NA of the display panel 150, respectively, as an example. However, the present disclosure is not limited thereto.

Figure 6:
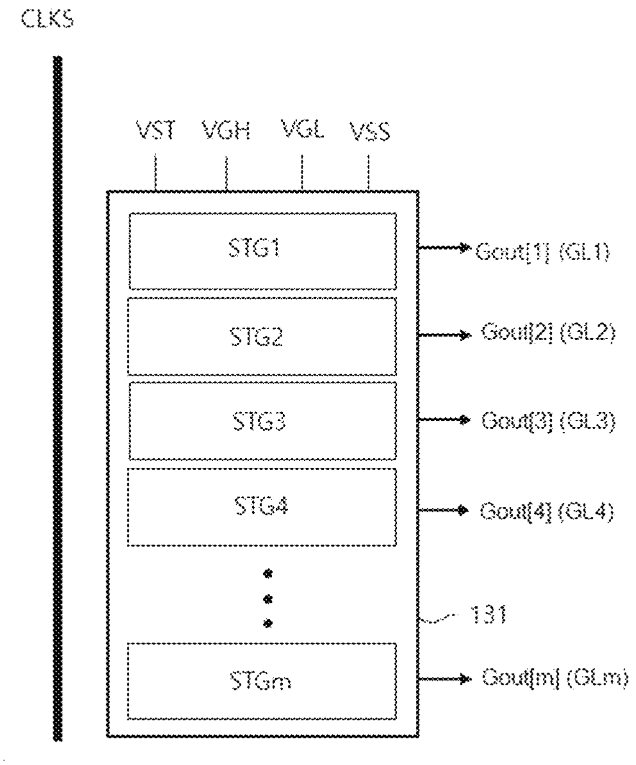
FIG. 6 is a block diagram illustrating a shift register according to a first example embodiment.
Figure 7:
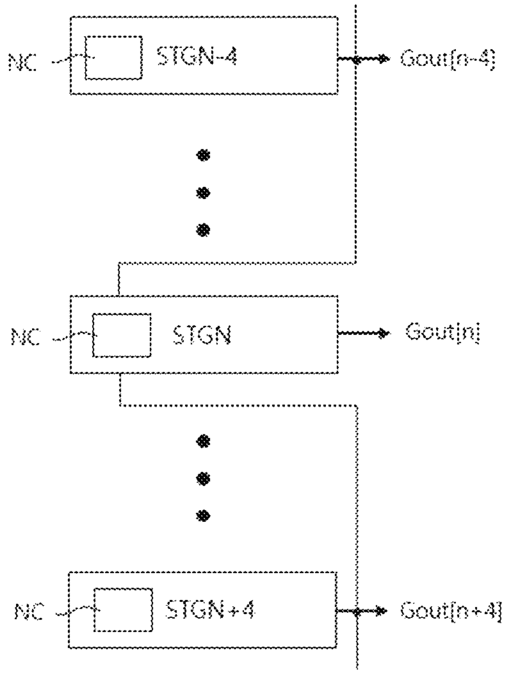
FIG. 7 is a block diagram illustrating a connection structure of stages included in the shift register.
Figure 8:
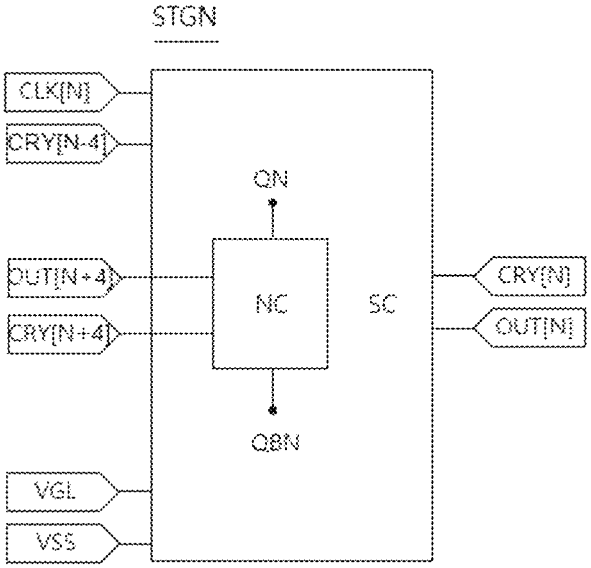
FIG. 8 is a block diagram illustrating an Nth stage included in the shift register.
Figure 9:
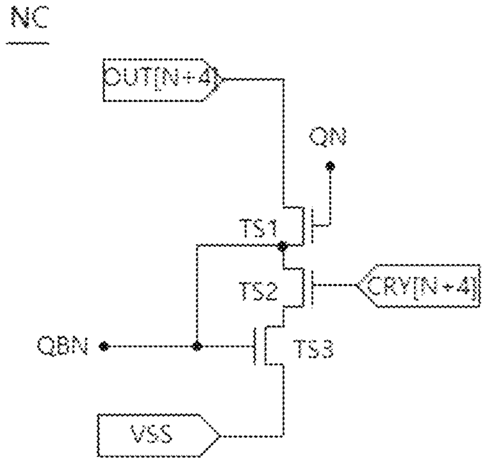
FIG. 9 is a circuit diagram illustrating a compensation circuit included in the Nth stage.
Figure 10:
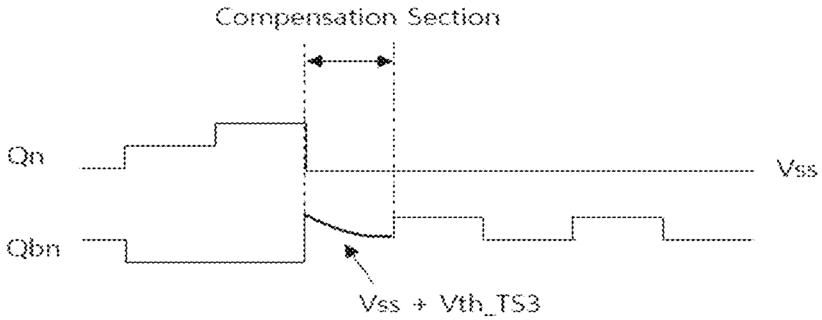
FIG. 10 is a waveform diagram for describing an operation of the compensation circuit and resulting compensation for deterioration of a QB-node.

FIG. 6 is a block diagram illustrating a shift register according to a first example embodiment, FIG. 7 is a block diagram illustrating a connection structure of stages included in the shift register, FIG. 8 is a block diagram illustrating an Nth stage included in the shift register, FIG. 9 is a circuit diagram illustrating a compensation circuit included in the Nth stage, and FIG. 10 is a waveform diagram for describing an operation of the compensation circuit and resulting compensation for deterioration of a QB-node.

As illustrated in FIG. 6, the shift register 131 according to the first example embodiment may be connected to clock signal lines CLKS, a start signal line VST, a high-voltage line VGH, a first low-voltage line VGL, and a second low-voltage line VSS.

The shift register 131 has a configuration for outputting the gate signals Gout[1] to Gout[m] and may include a plurality of stages STG1 to STGm. The shift register 131 may output the gate signals Gout[1] to Gout[m] in various forms depending on the connection structure of the plurality of stages STG1 to STGm and the clock signal lines CLKS. The clock signal lines CLKS are illustrated as one thick wire, and a connection relationship between the plurality of stages STG1 to STGm and the clock signal lines CLKS is not shown.

The plurality of stages STG1 to STGm may sequentially (reversely or non-sequentially) output the gate signals Gout [1] to Gout[m] through the gate lines GL1 to GLm. For example, the plurality of stages STG1 to STGm may start outputting the first gate signal Gout[1] through the first gate line GL1 connected to the first stage STG1 and end output timing of one frame by outputting the Mth gate signal Gout[m] through the Mth gate line GLm connected to the Mth stage STGm.

Meanwhile, although not illustrated, the plurality of stages STG1 to STGm may include a dummy stage connected to a front end of the first stage STG1 and a rear end of the Mth stage STGm.

As illustrated in FIG. 7, according to the first example embodiment, the plurality of stages STG1 to STGm may have a dependent connection structure. The Nth stage STGN may operate based on a signal output from the (N−4)th stage STGN−4 (a stage located four stages before the Nth stage) and a signal output from the (N+4)th stage STGN+4 (a stage located four stages after the Nth stage). To this end, the Nth stage STGN may have a connection structure connected to an output terminal OUT[N−4] of the (N−4)th stage STGN−4 and an output terminal OUT[N+4] of the (N+4)th stage STGN+4.

According to the first example embodiment, each of the plurality of stages STGN−4, STGN, and STGN+4 may include a compensation circuit NC. The compensation circuit NC may serve to compensate for deterioration of at least one of nodes (or transistors connected to the nodes) included in the plurality of stages STGN−4, STGN, and STGN+4. A description related thereto is addressed below. Hereinafter, the compensation circuit included in the first example embodiment will be described using the Nth stage (arbitrary stage), which is one of the plurality of stages STG1 to STGm, as an example.

As illustrated in FIG. 8, according to the first example embodiment, the Nth stage STGN may include a signal generator SC and the compensation circuit NC. The signal generator SC may output an Nth carry signal through an Nth carry terminal CRY[N] and output an Nth gate signal through an Nth output terminal OUT[N]. The compensation circuit NC may compensate for deterioration of the QB-node QBN (or a transistor connected to the QB-node) included in the signal generator SC.

The Nth stage STGN may be connected to the Nth clock signal line CLK[N], the carry terminal (CRY[N−4]) of the (N−4)th stage, the output terminal OUT[N+4] of the (N+4)th stage, the carry terminal CRY[N+4] of the (N+4)th stage, the first low-voltage line VGL, and the second low-voltage line VSS.

The Nth stage STGN may operate based on the Nth clock signal applied through the Nth clock signal line CLK[N], an (N−4)th carry signal output through the carry terminal CRY[N−4] of the (N−4)th stage, an (N+4)th gate signal output through the output terminal OUT[N+4] of the (N+4) th stage, an (N+4)th carry signal output through the carry terminal CRY[N+4] of the (N+4)th stage, a first low voltage applied through the first low-voltage line VGL, and a second low voltage applied through the second low-voltage line VSS.

The first low voltage applied through the first low-voltage line VGL and the second low voltage applied through the second low-voltage line VSS may have a relationship of "first low voltage>second low voltage". For example, the first low voltage applied through the first low-voltage line VGL may be set to −12 V to −14 V, and the second low voltage applied through the second low-voltage line VSS may be set to −16 V.

As illustrated in FIGS. 8 to 10, according to the first example embodiment, the compensation circuit NC included in the Nth stage STGN may include a first compensation transistor TS1, a second compensation transistor TS2, and a third compensation transistor TS3.

The first compensation transistor TS1 may have a gate electrode connected to a Q-node QN, a first electrode connected to the output terminal OUT[N+4] of the (N+4)th stage, and a second electrode connected to a first electrode of the second compensation transistor TS2, a gate electrode of the third compensation transistor TS3, and the QB-node QBN. The first compensation transistor TS1 may be turned on based on a potential Qn of the Q-node QN to transmit the (N+4)th gate signal output through the output terminal OUT[N+4] of the (N+4)th stage to the QB-node QBN.

The second compensation transistor TS2 may have a gate electrode connected to the carry terminal CRY[N+4] of the (N+4)th stage, a first electrode connected to the second electrode of the first compensation transistor TS1, the gate electrode of the third compensation transistor TS3, and the QB-node QBN, and a second electrode connected to a first electrode of the third compensation transistor TS3. The second compensation transistor TS2 may be turned on based on the (N+4)th carry signal output through the carry terminal CRY[N+4] of the (N+4)th stage to connect the second electrode of the first compensation transistor TS1 and the first electrode of the third compensation transistor TS3 to each other.

The third compensation transistor TS3 may have the gate electrode connected to the QB-node QBN, the first electrode connected to the second electrode of the second compensation transistor TS2, and a second electrode connected to the second low-voltage line VSS. The third compensation transistor TS3 may be turned on based on a potential Qbn of the QB-node QBN to transmit the second low volage applied through the second low-voltage line VSS.

The compensation circuit NC may operate as follows to compensate for deterioration of the QB-node (or a transistor connected to the QB-node).

During a compensation section, the QB-node QBN may be charged by the (N+4)th gate signal Gout[n+4] applied through the first compensation transistor TS1, which is turned on based on the potential Qn of the Q-node QN. During the compensation section, the second compensation transistor TS2 may be turned on based on the (N+4)th carry signal, and the third compensation transistor TS3 may be turned on by the (N+4)th gate signal Gout[n+4] stored in the QB-node QBN.

When the second compensation transistor TS2 and the third compensation transistor TS3 are turned on, the potential Qbn of the QB-node QBN may be discharged through the second low-voltage line VSS, excluding a threshold voltage of the third compensation transistor TS3. Accordingly, the potential Qbn of the QB-node QBN may be determined to be "Vss+Vth_TS3". Here, Vss may correspond to the second low voltage, and Vth_TS3 may correspond to the threshold voltage of the third compensation transistor.

Depending on the operation of the compensation circuit NC, the potential Qbn of the QB-node QBN may be determined and formed as a compensation voltage as "Vss+Vth_TS3", and accordingly, deterioration of at least one of the transistors connected to the QB-node QBN may be compensated based on the compensation voltage. A detailed description related to deterioration compensation according to the operation of the compensation circuit NC will be given in a second example embodiment described below.

Figure 11:
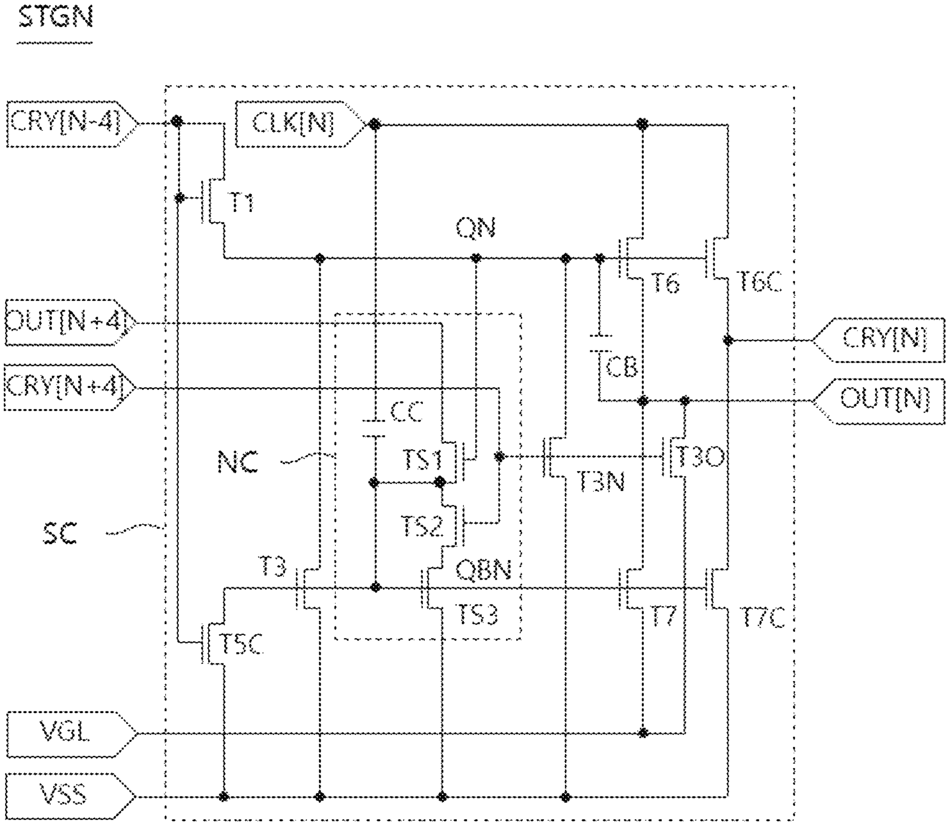
FIG. 11 is a circuit diagram of an Nth stage according to a second example embodiment.
Figure 12:
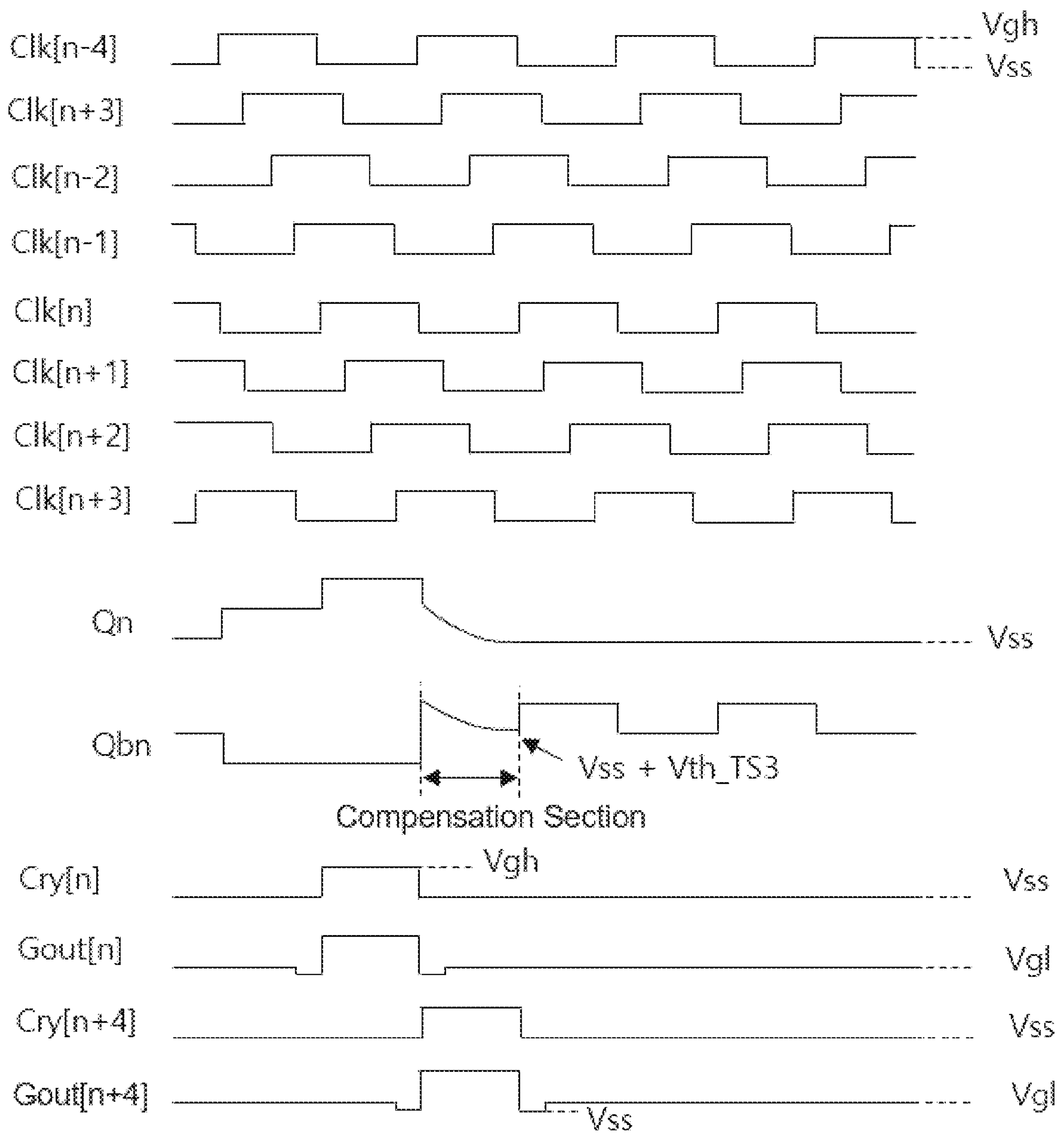
FIGS. 12 and 13 are driving waveform diagrams of the Nth stage according to the second example embodiment.
Figure 13:
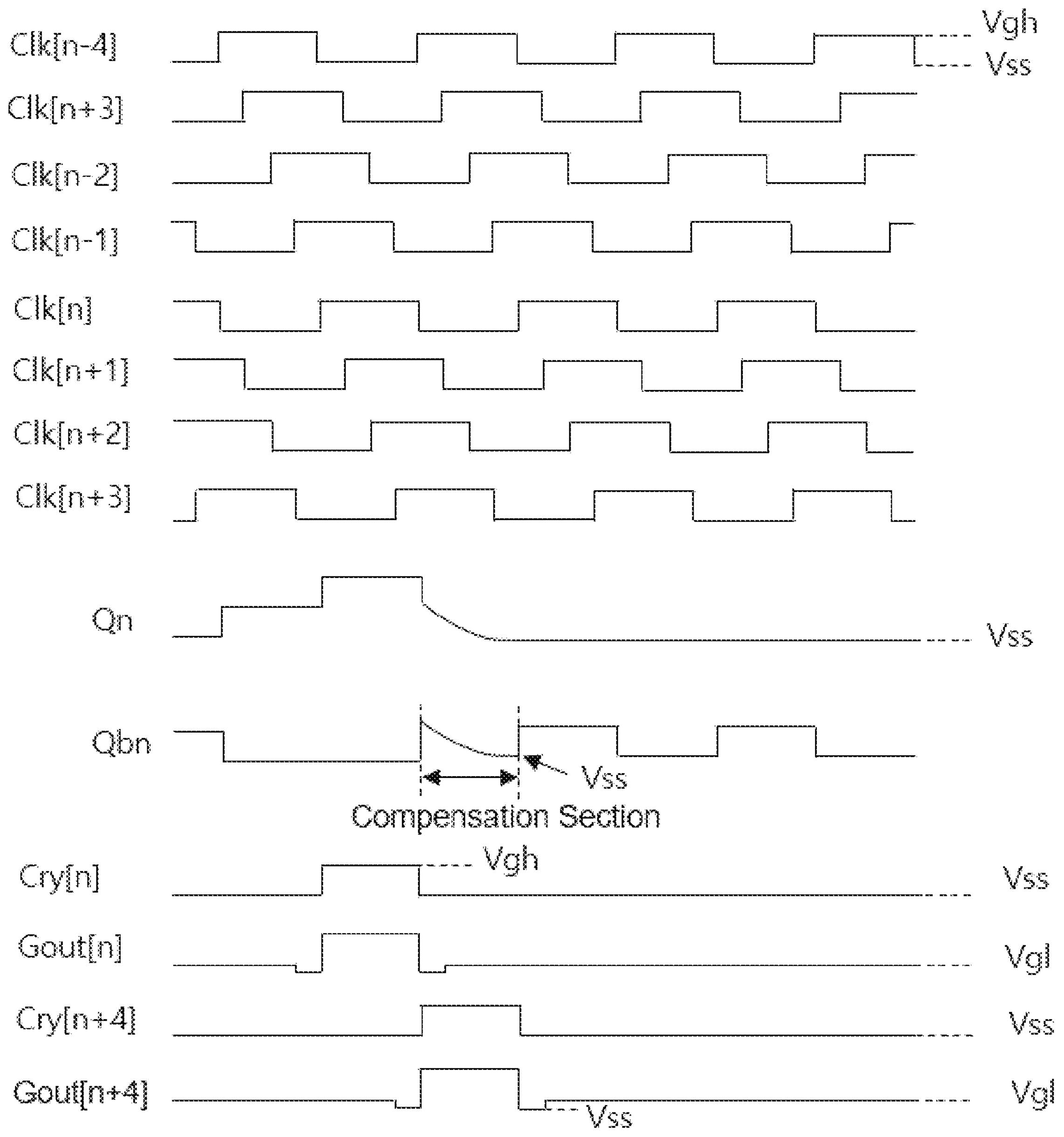
Figure 14:
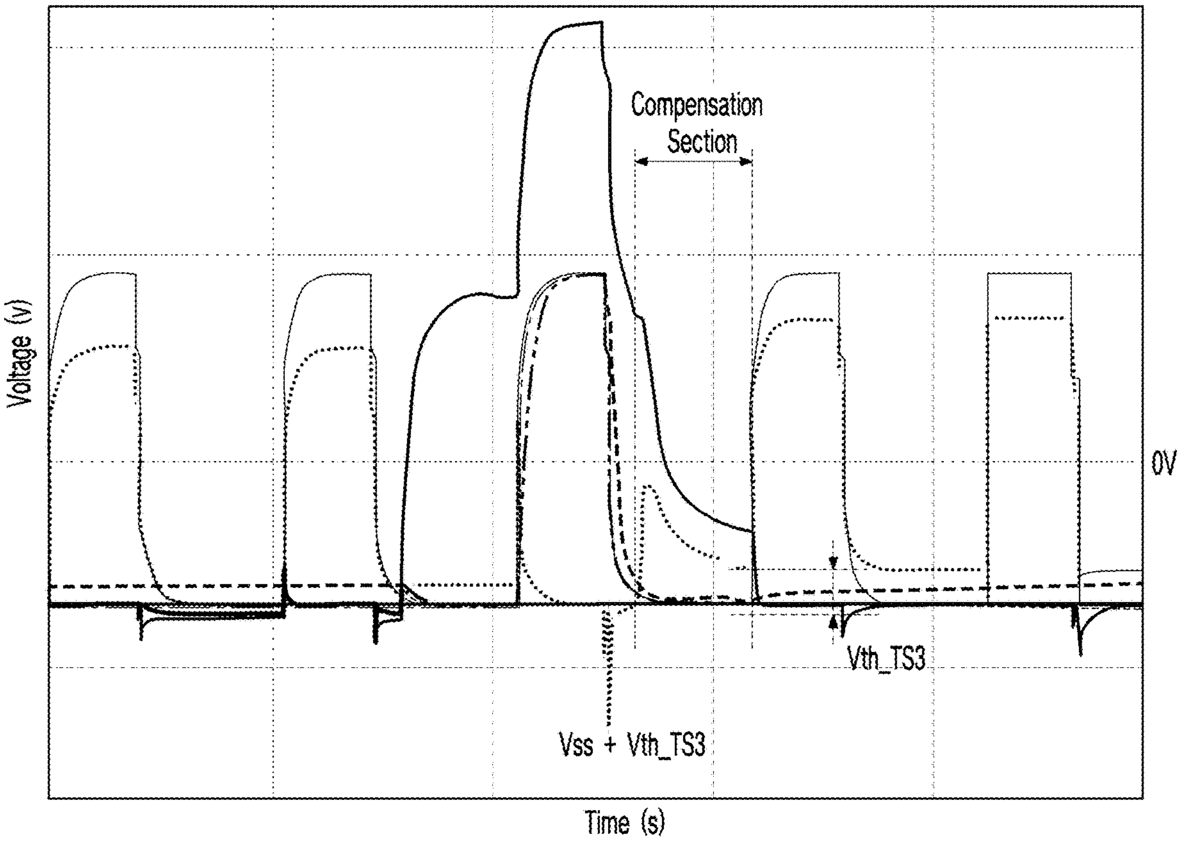
FIGS. 14 and 15 are simulation results of a gate driver implemented based on the second example embodiment.
Figure 15:
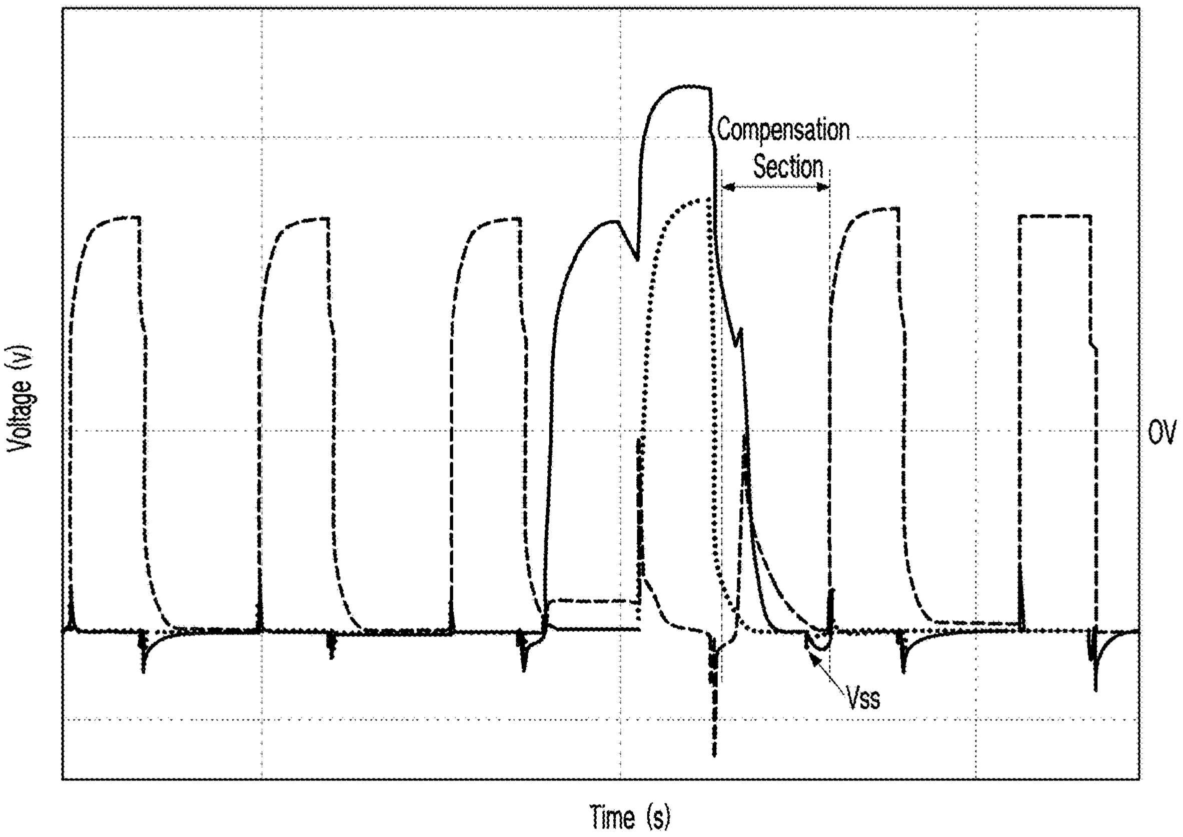

FIG. 11 is a circuit diagram of the Nth stage according to the second example embodiment, FIGS. 12 and 13 are driving waveform diagrams of an Nth stage according to the second example embodiment, and FIGS. 14 and 15 are simulation results of the gate driver implemented based on the second example embodiment.

As illustrated in FIG. 11, the Nth stage STGN according to the second example embodiment may include a signal generator SC configured to output an Nth carry signal through an Nth carry terminal CRY[N] and output an Nth gate signal through an Nth output terminal OUT[N], and a compensation circuit NC configured to compensate for deterioration of a QB-node QBN (or a transistor connected to the QB-node) included in the signal generator SC.

According to the second example embodiment, the signal generator SC may include a first transistor T1, a second transistor T5C, a third transistor T3, a fourth transistor T3N, a fifth transistor T30, a first pull-up transistor T6, a first pull-down transistor T7, a second pull-up transistor T6C, a second pull-down transistor T7C, a first capacitor CC, and a second capacitor CB.

The first transistor T1 may have a gate electrode and a first electrode connected to a carry terminal CRY[N−4](or a start signal line) of an (N−4)th stage and a second electrode connected to a Q-node QN. The first transistor T1 may be turned on based on an (N−4)th carry signal output through the carry terminal CRY[N−4] of the (N−4)th stage (or the start signal output through the start signal line) to transmit the (N−4)th carry signal to the Q-node QN.

The second transistor T5C may have a gate electrode connected to the carry terminal CRY[N−4](or the start signal line) of the (N−4)th stage, a first electrode connected to the QB-node QBN, and a second electrode connected to the second low-voltage line VSS. The second transistor T5C may be turned on based on the (N−4)th carry signal output through the carry terminal CRY[N−4] of the (N−4)th stage (or the start signal output through the start signal line) to transmit a second low voltage to the QB-node QBN.

The third transistor T3 may have a gate electrode connected to the QB-node QBN, a first electrode connected to the Q-node QN, and a second electrode connected to the second low-voltage line VSS. The third transistor T3 may be turned on based on a voltage of the QB-node QBN to transmit the second low voltage to the Q-node QN.

The fourth transistor T3N may have a gate electrode connected to a carry terminal CRY[N+4] of an (N+4)th stage, a first electrode connected to the Q-node QN, and a second electrode connected to the second low-voltage line VSS. The fourth transistor T3N may be turned on based on an (N+4)th carry signal to transmit the second low voltage to the Q-node QN.

The fifth transistor T30 may have a gate electrode connected to the carry terminal CRY[N+4] of the (N+4)th stage, a first electrode connected to the Nth output terminal OUT [N], and a second electrode connected to the first low-voltage line VGL. The fifth transistor T30 may be turned on based on the (N+4)th carry signal to transmit the first low voltage to the Nth output terminal OUT[N].

The first pull-up transistor T6 may have a gate electrode connected to the Q-node QN, a first electrode connected to the Nth clock signal line CLK[N], and a second electrode connected to the Nth output terminal OUT[N]. The first pull-up transistor T6 may be turned on based on a potential of the Q-node QN to transmit the Nth clock signal to the Nth output terminal OUT[N]. When the first pull-up transistor T6 is turned on, a gate signal at a high voltage may be output through the Nth output terminal OUT[N] of the Nth stage STGN.

The first pull-down transistor T7 may have a gate electrode connected to the QB-node QBN, a first electrode connected to the Nth output terminal OUT[N], and a second electrode connected to the first low-voltage line VGL. The first pull-down transistor T7 may be turned on based on a potential of the QB-node QBN to transmit the first low voltage to the Nth output terminal OUT[N]. When the first pull-down transistor T7 is turned on, a gate signal at a low voltage may be output through the Nth output terminal OUT[N] of the Nth stage STGN.

The second pull-up transistor T6C may have a gate electrode connected to the Q-node QN, a first electrode connected to the Nth clock signal line CLK[N], and a second electrode connected to the Nth carry terminal CRY[N]. The second pull-up transistor T6C may be turned on based on a potential of the Q-node QN to transmit the Nth clock signal to the Nth carry terminal CRY[N]. When the second pull-up transistor T6C is turned on, a carry signal at a high voltage may be output through the Nth carry terminal CRY[N] of the Nth stage STGN.

The second pull-down transistor T7C may have a gate electrode connected to the QB-node QBN, a first electrode connected to the Nth carry terminal CRY[N], and a second electrode connected to the second low-voltage line VSS. The second pull-down transistor T7C may be turned on based on a potential of the QB-node QBN to transmit the second low voltage to the Nth carry terminal CRY[N]. When the second pull-down transistor T7C is turned on, a carry signal at a low voltage may be output through the Nth carry terminal CRY[N] of the Nth stage STGN.

The first capacitor CC may have a first electrode connected to the Nth clock signal line CLK[N], and a second electrode connected to the second electrode of the first compensation transistor TS1, a first electrode of the second compensation transistor TS2, and the QB-node QBN. The first capacitor CC may serve to stably maintain a charging state of the QB-node QBN in response to the Nth clock signal when the Q-node QN is in a discharge state. Accordingly, the QB-node QBN is formed in a floating state. However, the QB-node QBN is coupled to be charged whenever the Nth clock signal is applied by the first capacitor CC.

The second capacitor CB may have a first electrode connected to the Q-node QN and the gate electrode of the pull-up transistor T6, and a second electrode connected to the Nth output terminal OUT[N]. The second capacitor CB may serve to bootstrap the Q-node QN to ensure stable output from the Nth output terminal OUT[N].

According to the second example embodiment, the compensation circuit NC may include the first compensation transistor TS1, the second compensation transistor TS2, and the third compensation transistor TS3.

The first compensation transistor TS1 may have a gate electrode connected to the Q-node QN, a first electrode connected to the output terminal OUT[N+4] of the (N+4)th stage, and a second electrode connected to the second electrode of the first capacitor CC, a first electrode of the second compensation transistor TS2, the gate electrode of the third compensation transistor TS3, and the QB-node QBN. The first compensation transistor TS1 may be turned on based on a potential of the Q-node QN to transmit the (N+4)th gate signal output through the output terminal OUT[N+4] of the (N+4)th stage to the QB-node QBN.

The second compensation transistor TS2 may have a gate electrode connected to the carry terminal CRY[N+4] of the (N+4)th stage, a first electrode connected to the second electrode of the first capacitor CC, the second electrode of the first compensation transistor TS1, the gate electrode of the third compensation transistor TS3, and the QB-node QBN, and a second electrode connected to a first electrode of the third compensation transistor TS3. The second compensation transistor TS2 may be turned on based on the (N+4)th carry signal output through the carry terminal CRY[N+4] of the (N+4)th stage to connect the second electrode of the first compensation transistor TS1 and the first electrode of the third compensation transistor TS3 to each other.

The third compensation transistor TS3 may have a gate electrode connected to the QB-node QBN, a first electrode connected to the second electrode of the second compensation transistor TS2, and a second electrode connected to the second low-voltage line VSS. The third compensation transistor TS3 may be turned on based on a potential of the QB-node QBN to transmit the second low voltage applied through the second low-voltage line VSS to the second compensation transistor TS2.

As illustrated in FIGS. 6, 11, and 12, the shift register 131 implemented based on the Nth stage STGN according to the second example embodiment may operate based on 8-phase clock signals Clk[n−4] to Clk[n+3] having overlapping 4H sections. Further, any Nth stage STGN among the stages STG1 to STGm included in the shift register 131 may operate based on the Nth clock signal Clk[n], etc. among the clock signals Clk[n−4] to Clk[n+3]. Here, the clock signals Clk[n−4] to Clk[n+3] may include levels of a high voltage Vgh and a second low voltage Vss.

When the Q-node QN is charged with a potential Qn, the Nth stage STGN may output an Nth gate signal Gout[n] at a high voltage Vgh and an Nth carry signal Cry[n] at a high voltage Vgh. When the QB-node QBN is charged with a potential Qbn, the Nth stage STGN may output an Nth gate signal Gout[n] at a first low voltage Vgl and an Nth carry signal Cry[n] at a second low voltage Vss.

The Q-node QN may be discharged by operation of the third transistor T3. The third transistor T3 and the third compensation transistor TS3 may be turned on based on the potential Qbn of the QB-node QBN. The third transistor T3 and the third compensation transistor TS3 operate under the same condition for the same time, and thus may deteriorate in the same way. In other words, a threshold voltage of the third transistor T3 and a threshold voltage of the third compensation transistor TS3 may have the same degree of degradation (Vth shift).

According to the second example embodiment, the shift register 131 may compensate for deterioration of the QB-node (or the transistor connected to the QB-node) by operation of the compensation circuit NC, which is described as follows.

The shift register 131 implemented based on the Nth stage STGN according to the second example embodiment may define a time from when the QB-node QBN is bootstrapped and then discharged and until a subsequent clock signal is applied as a compensation section in which deterioration compensation of the QB-node QBN (or the transistor connected to the QB-node) is performed.

During the compensation section, the QB-node QBN may be charged by the (N+4)th gate signal Gout[n+4] applied through the first compensation transistor TS1, which is turned on based on the potential Qn of the Q-node QN. During the compensation section, the second compensation transistor TS2 may be turned on based on the (N+4)th carry signal, and the third compensation transistor TS3 may be turned on by the (N+4)th gate signal Gout[n+4] stored in the QB-node QBN.

When the second compensation transistor TS2 and the third compensation transistor TS3 are turned on, the potential Qbn of the QB-node QBN may be discharged through the second low-voltage line VSS, excluding the threshold voltage of the third compensation transistor TS3. Accordingly, the potential Qbn of the QB-node QBN may be determined to be "Vss+Vth_TS3". Here, Vss may correspond to the second low voltage, and Vth_TS3 may correspond to the threshold voltage of the third compensation transistor.

Therefore, when a subsequent clock signal is applied, a voltage (Vss+Vth_TS3) higher by the threshold voltage of the third compensation transistor TS3 may be formed in the QB-node QBN. Since a threshold voltage of the third transistor T3 and a threshold voltage Vth_TS3 of the third compensation transistor TS3 may have the same degree of degradation (Vth shift), as a result, deterioration of the third transistor T3 connected to the QB-node QBN may be compensated by the voltage (Vss+Vth_TS3) formed in the QB-node QBN. This operation may sequentially occur in the same way as the Nth stage STGN in all stages included in the shift register 131.

Meanwhile, the threshold voltage of the third compensation transistor TS3 may move in a positive direction (Vth shift>0V) as well as move in a negative direction (Vth shift<0V).

FIG. 12 illustrates a voltage formed at the QB-node during the compensation section when the threshold voltage of the third compensation transistor TS3 moves in the positive direction, and FIG. 13 illustrates a voltage formed at the QB-node during the compensation section when the threshold voltage of the third compensation transistor TS3 moves in the negative direction.

FIG. 14 is a simulation result obtained in the same case as that of FIG. 12 (Vth shift>0V), and a voltage (Vss+Vth_TS3) formed in the QB-node QBN during the compensation section and the threshold voltage (Vth_TS3) of the third compensation transistor TS3 may be checked for reference. FIG. 15 is a simulation result obtained in the same case as that of FIG. 13 (Vth shift<0V), and the voltage Vss formed in the QB-node QBN during the compensation section may be checked for reference.

As in FIGS. 12 and 14, when the threshold voltage of the third compensation transistor TS3 moves in the positive direction, a voltage (Vss+Vth_TS3) higher by the threshold voltage of the third compensation transistor TS3 may be formed in the QB-node QBN.

As in FIGS. 13 and 15, when the threshold voltage of the third compensation transistor TS3 moves in the negative direction, a lower voltage (Vss) when compared to the case when the threshold voltage of the third compensation transistor TS3 moves in the positive direction may be formed in the QB-node QBN.

In this instance, since a gate-source voltage Vgs of the first compensation transistor TS1 has a condition of "Vgs<0", leakage may not occur toward the Nth output terminal OUT[N]. Further, the gate-source voltage Vgs of each of the second compensation transistor TS2 and the third compensation transistor TS3 has a condition close to 0. However, the gate-source voltage Vgs of each of the second compensation transistor TS2 and the third compensation transistor TS3 may be maintained by the second low voltage Vss formed in the QB-node QBN.

Therefore, the second example embodiment robustly operates and compensates for deterioration even when the threshold voltage of the third compensation transistor TS3 moves in the positive or negative direction, so that stable output may be formed.

As a result, it is possible to relieve a problem of the gate signal being output in multiple forms due to the ripple of the first pull-up transistor T6 being generated every time a clock signal is generated due to a shift of the threshold voltage of the third transistor T3. In addition, it is possible to relieve a problem of the gate signal not being output due to a decrease in the output characteristics of the first pull-up transistor T6 or the second pull-up transistor T6C due to a shift of the threshold voltage of the third transistor T3.

Meanwhile, the second example embodiment is only an example, and the configuration of the compensation circuit NC to achieve the effects described in the present disclosure is not limited thereto and may be modified, which is understood with reference to the following example embodiments.

Figure 16:
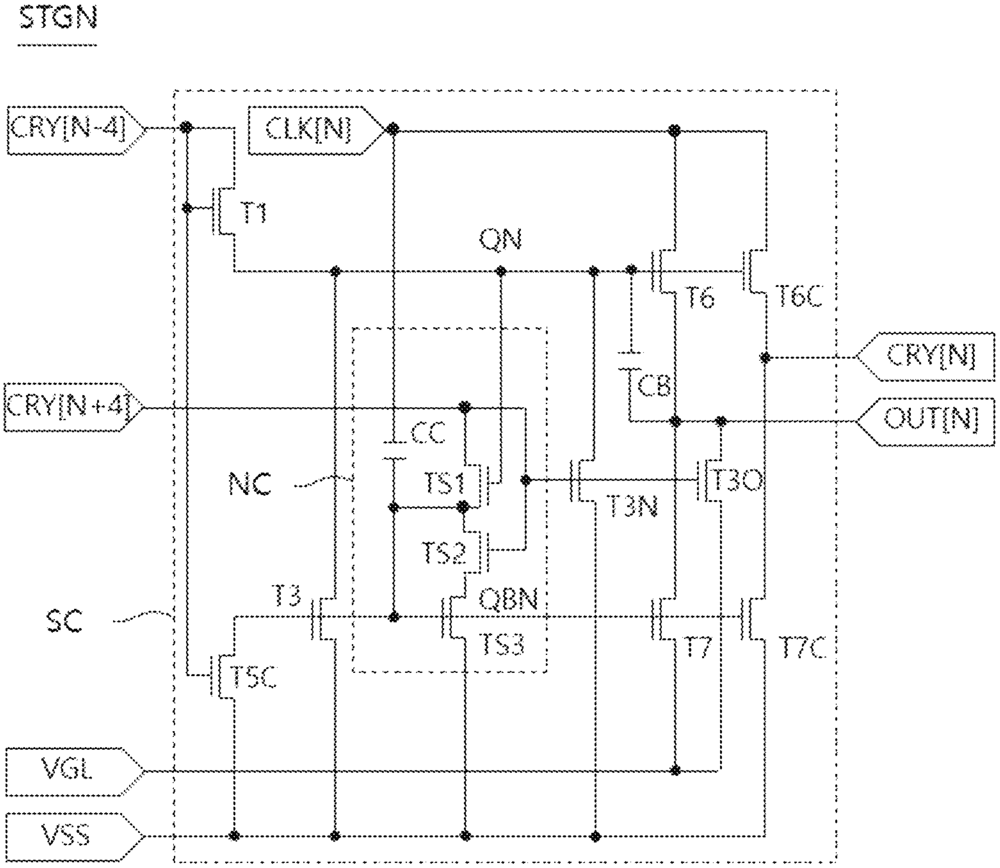
FIG. 16 is a circuit diagram of an Nth stage according to a third example embodiment.
Figure 17:
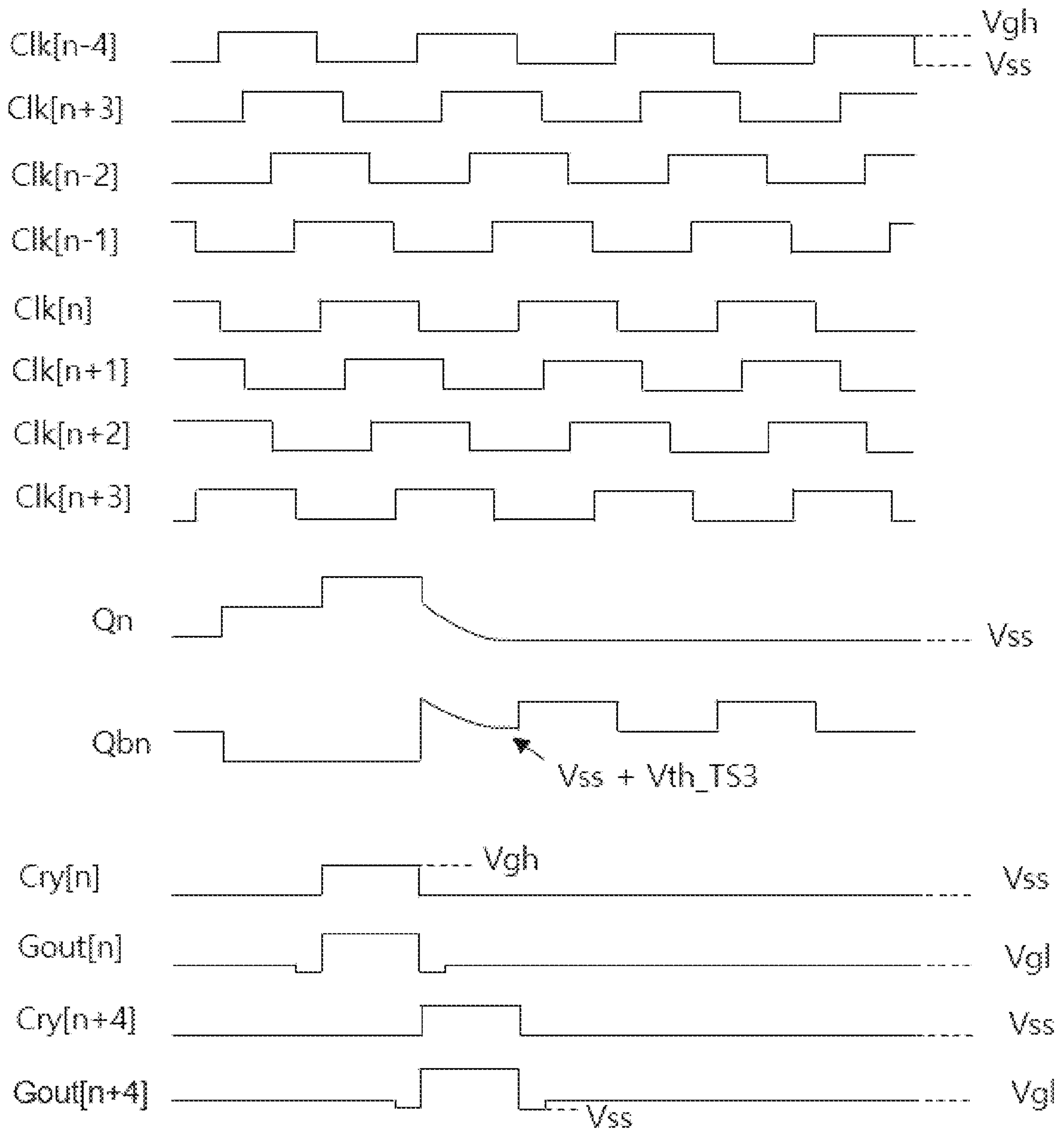
FIG. 17 is a driving waveform diagram of the Nth stage according to the third example embodiment.

FIG. 16 is a circuit diagram of an Nth stage according to a third example embodiment, and FIG. 17 is a driving waveform diagram of the Nth stage according to the third example embodiment.

As illustrated in FIGS. 16 and 17, the Nth stage STGN according to the third example embodiment may include a signal generator SC configured to output an Nth carry signal through an Nth carry terminal CRY[N] and output an Nth gate signal through an Nth output terminal OUT[N], and a compensation circuit NC configured to compensate for deterioration of a QB-node QBN (or a transistor connected to the QB-node) included in the signal generator SC.

According to the third example embodiment, the signal generator SC may include a first transistor T1, a second transistor T5C, a third transistor T3, a fourth transistor T3N, a fifth transistor T30, a first pull-up transistor T6, a first pull-down transistor T7, a second pull-up transistor T6C, a second pull-down transistor T7C, a first capacitor CC, and a second capacitor CB.

According to the third example embodiment, the compensation circuit NC may include a first compensation transistor TS1, a second compensation transistor TS2, and a third compensation transistor TS3.

The third example embodiment is the same as the second example embodiment except for a connection relationship of some of the components included in the compensation circuit NC. Therefore, in the following, only components included in the compensation circuit NC and a connection relationship thereof are described, and thus an undescribed part is understood with reference to the second example embodiment.

The first compensation transistor TS1 may have a gate electrode connected to the Q-node QN, a first electrode connected to the carry terminal CRY[N+4] of the (N+4)th stage, and a second electrode connected to the second electrode of the first capacitor CC, the first electrode of the second compensation transistor TS2, the gate electrode of the third compensation transistor TS3, and the QB-node QBN. The first compensation transistor TS1 may be turned on based on a potential Qn of the Q-node QN to transmit an (N+4)th carry signal Cry[N+4] output through the carry terminal CRY[N+4] of the (N+4)th stage to the QB-node QBN.

The second compensation transistor TS2 may have a gate electrode connected to the carry terminal CRY[N+4] of the (N+4)th stage, a first electrode connected to the second electrode of the first capacitor CC, the second electrode of the first compensation transistor TS1, the gate electrode of the third compensation transistor TS3, and the QB-node QBN, and a second electrode connected to a first electrode of the third compensation transistor TS3. The second compensation transistor TS2 may be turned on based on the (N+4)th carry signal Cry[N+4] output through the carry terminal CRY[N+4] of the (N+4)th stage to connect the second electrode of the first compensation transistor TS1 and the first electrode of the third compensation transistor TS3 to each other.

The third compensation transistor TS3 may have a gate electrode connected to the QB-node QBN, a first electrode connected to the second electrode of the second compensation transistor TS2, and a second electrode connected to the second low-voltage line VSS. The third compensation transistor TS3 may be turned on based on a potential Qbn of the QB-node QBN to transmit the second low voltage applied through the second low-voltage line VSS to the second compensation transistor TS2.

Meanwhile, as in FIG. 17, the third example embodiment illustrates only a voltage formed in the QB-node during the compensation section when the threshold voltage of the third compensation transistor TS3 moves in the positive direction. However, note that the third example embodiment may exhibit the effects described with reference to FIG. 13 in the second example embodiment.

Figure 18:
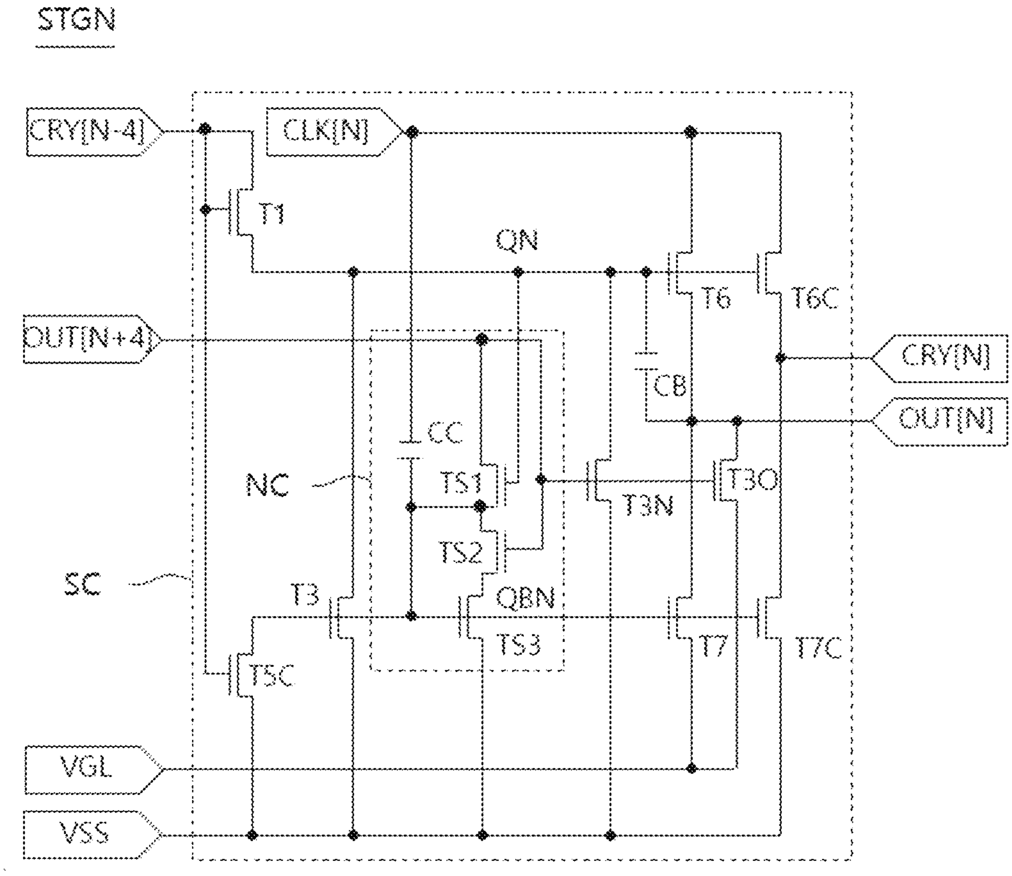
FIG. 18 is a circuit diagram of an Nth stage according to a fourth example embodiment.
Figure 19:
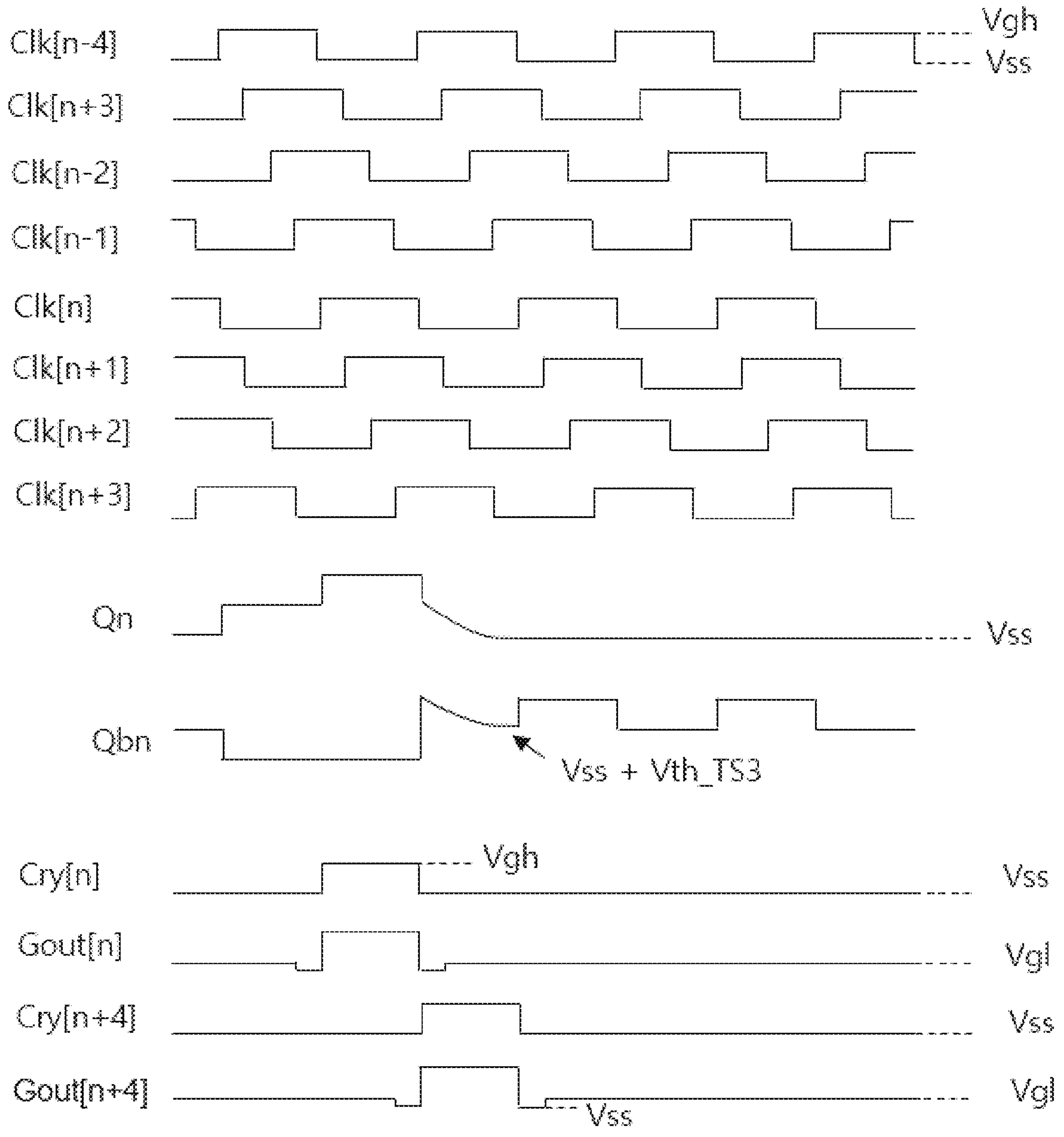
FIG. 19 is a driving waveform diagram of the Nth stage according to the fourth example embodiment.

FIG. 18 is a circuit diagram of an Nth stage according to a fourth example embodiment, and FIG. 19 is a driving waveform diagram of the Nth stage according to the fourth example embodiment.

As illustrated in FIGS. 18 and 19, the Nth stage STGN according to the fourth example embodiment may include a signal generator SC configured to output an Nth carry signal through an Nth carry terminal CRY[N] and output an Nth gate signal through an Nth output terminal OUT[N], and a compensation circuit NC configured to compensate for deterioration of a QB-node QBN (or a transistor connected to the QB-node) included in the signal generator SC.

According to the fourth example embodiment, the signal generator SC may include a first transistor T1, a second transistor T5C, a third transistor T3, a fourth transistor T3N, a fifth transistor T30, a first pull-up transistor T6, a first pull-down transistor T7, a second pull-up transistor T6C, a second pull-down transistor T7C, a first capacitor CC, and a second capacitor CB.

According to the fourth example embodiment, the compensation circuit NC may include a first compensation transistor TS1, a second compensation transistor TS2, and a third compensation transistor TS3.

The fourth example embodiment is the same as the second example embodiment except for a connection relationship of some of the components included in the compensation circuit NC. Therefore, in the following, only components included in the compensation circuit NC and a connection relationship thereof are described, and thus an undescribed part is understood with reference to the second example embodiment.

The first compensation transistor TS1 may have a gate electrode connected to the Q-node QN, a first electrode connected to the output terminal OUT[N+4] of the (N+4)th stage, and a second electrode connected to the second electrode of the first capacitor CC, the first electrode of the second compensation transistor TS2, the gate electrode of the third compensation transistor TS3, and the QB-node QBN. The first compensation transistor TS1 may be turned on based on a potential Qn of the Q-node QN to transmit an (N+4)th gate signal Gout[n+4] output through the output terminal OUT[N+4] of the (N+4)th stage to the QB-node QBN.

The second compensation transistor TS2 may have a gate electrode connected to the output terminal OUT[N+4] of the (N+4)th stage, a first electrode connected to the second electrode of the first capacitor CC, the second electrode of the first compensation transistor TS1, the gate electrode of the third compensation transistor TS3, and the QB-node QBN, and a second electrode connected to a first electrode of the third compensation transistor TS3. The second compensation transistor TS2 may be turned on based on the (N+4)th gate signal Gout[n+4] output through the output terminal OUT[N+4] of the (N+4)th stage to connect the second electrode of the first compensation transistor TS1 and the first electrode of the third compensation transistor TS3 to each other.

The third compensation transistor TS3 may have a gate electrode connected to the QB-node QBN, a first electrode connected to the second electrode of the second compensation transistor TS2, and a second electrode connected to the second low-voltage line VSS. The third compensation transistor TS3 may be turned on based on a potential Qbn of the QB-node QBN to transmit the second low voltage applied through the second low-voltage line VSS to the second compensation transistor TS2.

Meanwhile, as in FIG. 19, the fourth example embodiment illustrates only a voltage formed in the QB-node during the compensation section when the threshold voltage of the third compensation transistor TS3 moves in the positive direction. However, note that the fourth example embodiment may exhibit the effects described with reference to FIG. 13 in the second example embodiment.

As mentioned above, the present disclosure has an effect in that deterioration of the transistor whose gate electrode is connected to the QB-node is reflected and compensated for in each frame, so that problems caused by the threshold voltage of the transistor moving in the positive direction (for example, multi-signal output or no signal output, etc.) may be improved. In addition, the present disclosure has an effect in that output deviation between stages may be reduced since deterioration of the transistor whose gate electrode is connected to the QB-node may be compensated for in each frame. In addition, the present disclosure has an effect in that defects due to deterioration may be prevented from being transmitted to a specific stage since deterioration compensation is performed based on signals output from cascade stages.

The present disclosure has an effect in that a problem caused by a shift of the threshold voltage (for example, multi-signal output due to ripple of T6 every time a clock signal is generated) may be relieved by compensating for deterioration of the transistor in each frame. In addition, the present disclosure has an effect in that output deviation between stages may be reduced by compensating for deterioration of the transistor in each frame. In addition, the present disclosure has an effect in that defects due to deterioration may be prevented from being transmitted to a specific stage by performing deterioration compensation based on signals output from cascade stages.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:

a display panel configured to display an image; and a shift register connected to the display panel and comprising stages each having an output terminal for outputting a gate signal and a carry terminal for outputting a carry signal, wherein an Nth stage among the stages comprises:

a signal generator configured to output the gate signal of a high voltage and the carry signal of the high voltage in response to a potential of a Q-node, and output the gate signal of a first low voltage and the carry signal of a second low voltage in response to a potential of a QB-node, the signal generator including a transistor configured to be turned on based on the potential of the QB-node; and a compensation circuit configured to form a compensation voltage in the QB-node based on potentials of the Q-node and the QB-node and a signal output from another stage, to compensate for deterioration of the transistor included in the signal generator.

2. The display device according to claim 1, wherein the another stage is located after the Nth stage.

3. The display device according to claim 2, wherein the another stage is an (N+4)th stage located after the Nth stage.

4. The display device according to claim 1, wherein:

the compensation circuit comprises:

a first compensation transistor configured to be turned on based on the potential of the Q-node;

a second compensation transistor configured to be turned on based on the signal output from the another stage; and a third compensation transistor configured to be turned on based on the potential of the QB-node, and the compensation voltage comprises a threshold voltage of the third compensation transistor.

5. The display device according to claim 4, wherein the compensation circuit comprises:

the first compensation transistor has a gate electrode connected to the Q-node, a first electrode receiving the signal output from the another stage, and a second electrode connected to the QB-node;

the second compensation transistor has a gate electrode receiving the signal output from the another stage, a first electrode connected to the QB-node, and a second electrode connected to third compensation transistor; and the third compensation transistor has a gate electrode connected to the QB-node, a first electrode connected to the second electrode of the second compensation transistor, and a second electrode receiving the second low voltage.

6. The display device according to claim 5, wherein the second low voltage is lower than the first low voltage.

7. The display device according to claim 6, wherein:

the first electrode of the first compensation transistor is connected to the output terminal of the another stage to receive the gate signal output from the another stage, and the gate electrode of the second compensation transistor is connected to the carry terminal of the another stage to receive the carry signal output from the another stage.

8. The display device according to claim 6, wherein:

the first electrode of the first compensation transistor is connected to the carry terminal of the another stage to receive the carry signal output from the another stage, and the gate electrode of the second compensation transistor is connected to the carry terminal of the another stage to receive the carry signal output from the another stage.

9. The display device according to claim 6, wherein:

the first electrode of the first compensation transistor is connected to the output terminal of the another stage to receive the gate signal output from the another stage, and the gate electrode of the second compensation transistor is connected to the output terminal of the another stage to receive the gate signal output from the another stage.

10. A gate signal generation circuit, comprising:

a shift register comprising stages each having an output terminal for outputting a gate signal and a carry terminal for outputting a carry signal, wherein an Nth stage among the stages comprises:

a signal generator configured to output the gate signal of a high voltage and the carry signal of the high voltage in response to a potential of a Q-node, and output the gate signal of a first low voltage and the carry signal of a second low voltage in response to a potential of a QB-node, the signal generator including a transistor configured to be turned on based on the potential of the QB-node; and a compensation circuit configured to form a compensation voltage in the QB-node based on potentials of the Q-node and the QB-node and a signal output from another stage, to compensate for deterioration of the transistor included in the signal generator.

* * * * *